May 28, 1929.  M. B. TARK  1,714,739

SEWAGE DISPOSAL APPARATUS

Filed March 30, 1927  3 Sheets-Sheet 1

Inventor;
Marcus B. Tark,
by his Attorneys,
Howson & Howson

May 28, 1929.                    M. B. TARK                    1,714,739
                        SEWAGE DISPOSAL APPARATUS
                           Filed March 30, 1927
                                                        3 Sheets—Sheet 2
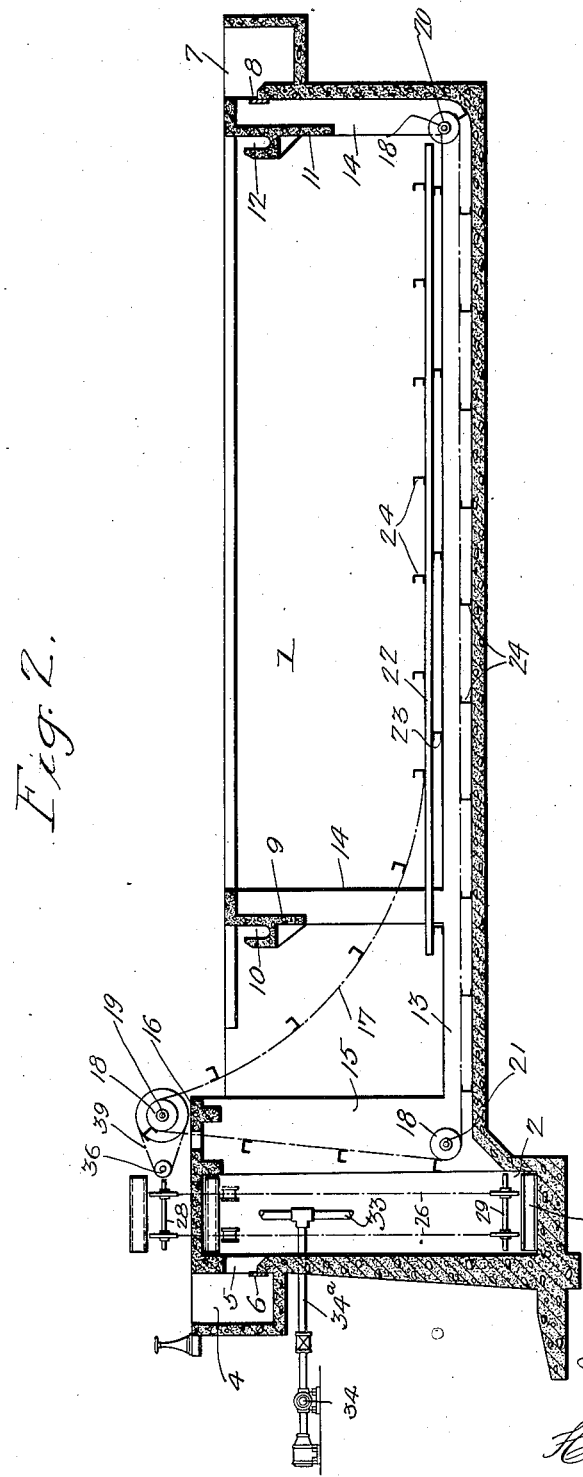
Inventor:
Marcus B. Tark,
by his Attorneys,
Howson & Howson May 28, 1929.  M. B. TARK  1,714,739
SEWAGE DISPOSAL APPARATUS
Filed March 30, 1927   3 Sheets-Sheet 3
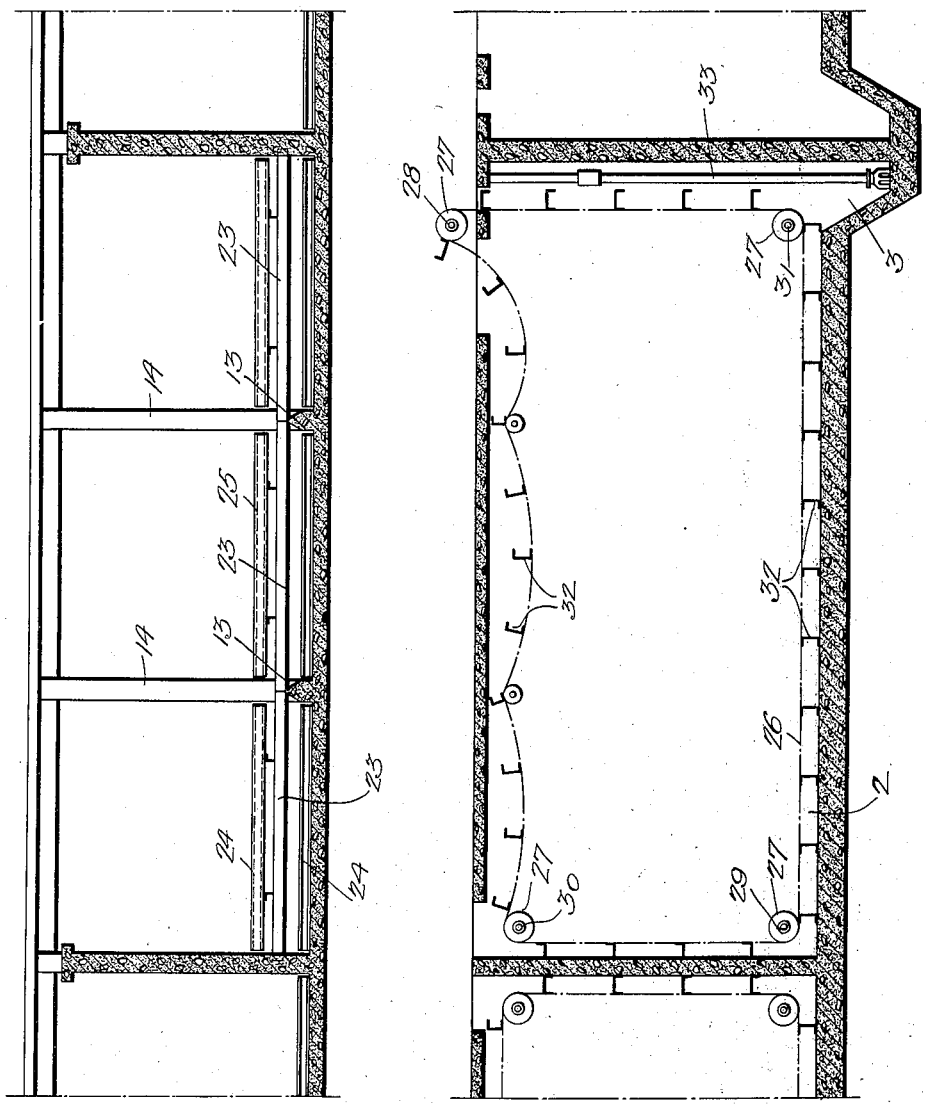

Patented May 28, 1929.

1,714,739

UNITED STATES PATENT OFFICE.

MARCUS B. TARK, OF PHILADELPHIA, PENNSYLVANIA, ASSIGNOR TO LINK-BELT COMPANY, OF CHICAGO, ILLINOIS, A CORPORATION OF ILLINOIS.

SEWAGE-DISPOSAL APPARATUS.

Application filed March 30, 1927. Serial No. 179,631. REISSUED

This invention relates primarily to improvements in sewage disposal apparatus, although it may find other useful applications in processes involving separation of solid matter from liquids.

The principal object of the invention is to provide novel means for collecting and removing from settling tanks and the like the precipitated sediment and sludge, the invention further residing in certain novel structural details of the collecting mechanism and of the tanks in which they are used.

In the attached drawings:

Fig. 2 is a longitudinal section on the line 2—2, Fig. 1;

Fig. 3 is a transverse section on the line 3—3, Fig. 1; and

Fig. 4 is a transverse section on the line 4—4, Fig. 1.

Figure 1:
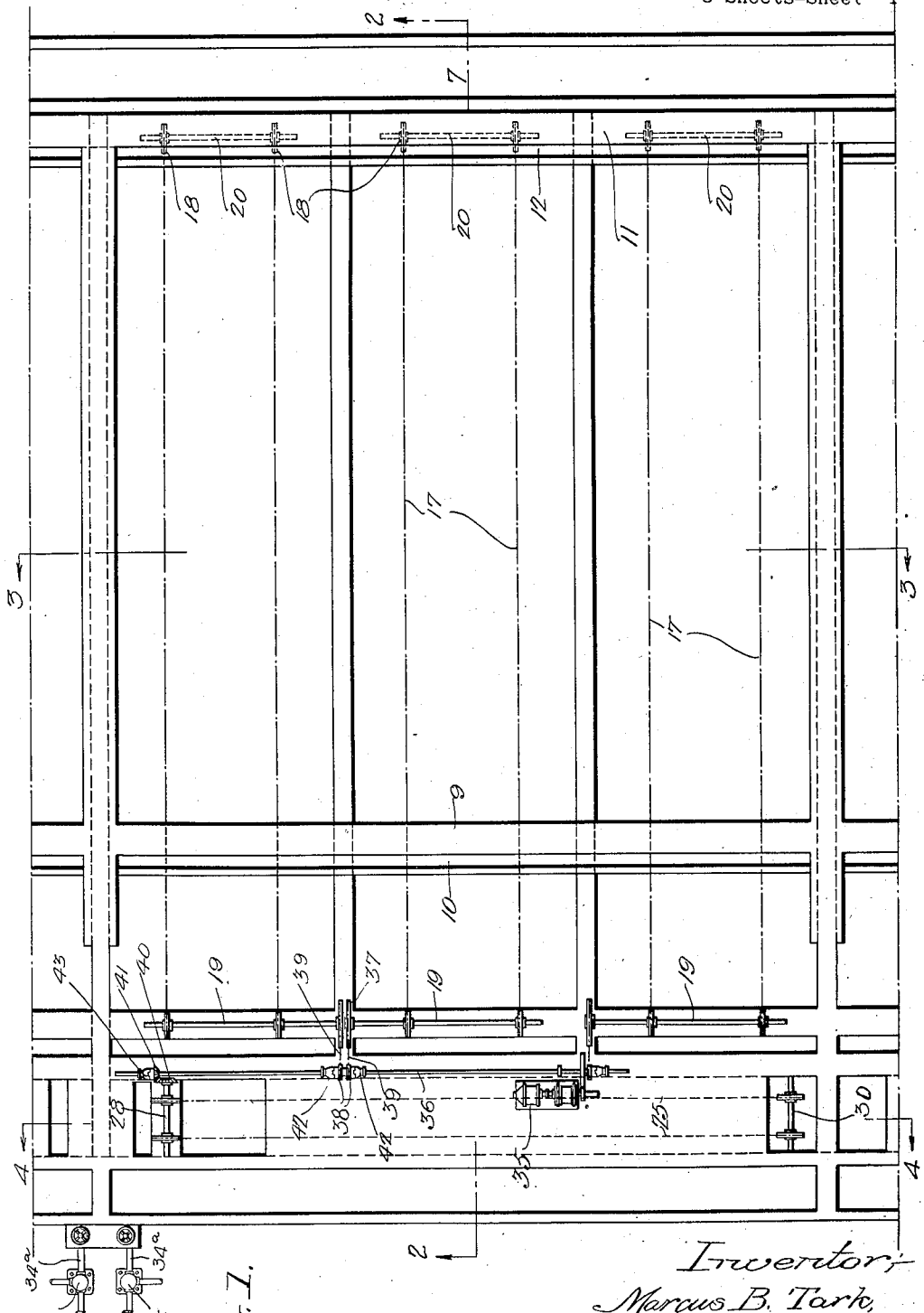
Figure 1 is a plan view of apparatus made in accordance with my invention.

With reference to the drawings, I have illustrated one unit of a series or bank of settling tanks of a type adapted for use in sewage disposal systems. These units may be built separately or in an integral structure with like units, as in the case illustrated. In accordance with my invention, each of the tank units comprises sludge-collecting mechanism preferably independently operable, as hereinafter set forth.

In the embodiment illustrated, the tank unit comprises a main chamber 1 having at one end a hopper 2 which extends below the floor surface of the major portion of the tank, as clearly illustrated in Fig. 2. This hopper 2 extends transversely completely across the width of the tank, and as shown in Fig. 4 has at one end a depression or subhopper 3. At the hopper end of the tank is an influent channel 4 which discharges through a port 5 and over a weir 6 into the main tank 1 directly over the hopper 2. At the opposite end of the tank is an effluent channel 7 into which the liquid from the tank 1 discharges over a weir 8. Preferably the weirs 6 and 8 are vertically adjustable.

Near the rear or hopper end of the tank is a transverse beam 9 in which is a transverse scum trough 10, and a similar beam and trough 11 and 12 are located immediately in back of the effluent channel 7, as shown best in Figs. 1 and 2.

Each of the tank units is divided into a plurality of longitudinal sections, three in the present instance, by means of a partitioning wall or walls 13, which as shown in Fig. 3 project only slightly above the bottom of the main portion of the tank and are tapered at the top to divert the settling solids to the collectors—hereinafter described—at the opposite sides thereof. From the partitioning walls uprights 14 rise to support the beams 9 and 11, and at the rear or hopper end of the tank uprights 15 are provided to support a platform 16 at the top, and it will be noted that the longitudinal partitions and the uprights 15 stop at the outer side of the hopper 2, leaving the hopper entirely unobstructed throughout its length and over the entire width of the tank unit.

In each of the longitudinal compartments formed by the partitioning walls 13, I provide a sludge collector which takes the form of an endless conveyer constituted by two strands of chain 17 which operate on sprockets 18 on a head shaft 19 mounted on the platform 16, a foot shaft 20 which is suitably journaled at the forward lower corner of the tank, and a turn shaft 21. The chains 17 in their lower run pass close above the bottom of the tank, and in their upper run are supported by a pair of rails 22 supported by transverse cross bars 23 mounted on the tops of the partitioning walls 13. The rails 22 may be channeled to receive the strands of chain. The two strands of chain are joined together by means of cross beams or flights 24 which project outwardly from the chain and which in the lower run of the conveyer engage and sweep the bottom of the main portion of the tank, as indicated in Fig. 2.

As shown in Fig. 3, the flights 24 extend substantially the entire width of the longitudinal compartments formed by the walls 13. The chains travel in the direction indicated by the arrow in Fig. 2, and in the lower run the flights 24 function to sweep the precipitated sediment or sludge from the bottom of the main tank into the hopper 2.

Within the hopper 2 I provide a conveyer or collector similar to that described, this conveyer comprising two endless strands of chain 26 which operate longitudinally of the hopper, or transversely of the tank, on sprockets 27, these sprockets being carried by a head shaft 28, a foot shaft 29 and upper and lower turn shafts 30 and 31. The chains 26 are connected by transverse bars or flights 32 which project outwardly from the chains and which in the lower run of the conveyer engage and sweep the bottom of the hopper. In the upper run the chains are supported by a plurality of idler sprockets.

As shown in Fig. 2 the flights 32 correspond in length with the width of the bottom of the hopper so that they may function to sweep the precipitated sediment and sludge from the bottom of the main section of the hopper into the sub-hopper 3. Pipes 33 extend downwardly to the bottoms of the hoppers 3, and these pipes communicate with pipes 34ª which pass through the rear wall of the tank and are operatively connected with suitable pumping apparatus 34. By this, or other suitable means, the sludge may be withdrawn from the sub-tanks 3 in which it is collected by the apparatus described above.

The sludge collectors operating in the main tank and in the hopper are driven through a prime mover in the form in the present instance of an electric motor 35 which is connected through suitable reduction gearing with a shaft 36 extending longitudinally of the tank units. This shaft is connected with the shafts 19 through sprockets 37 and 38 and sprocket chains 39, and with the shaft 28 through bevel gears 40 and 41. It will be noted that the shafts 19 are independent of each other, and each of the sprockets 38 is connected with the shaft 36 through a clutch 42 which permits individual and separate operation of any one or all of the collectors in the main tank. Also the gear 41 is normally connected with the shaft 36 through a clutch 43 by means of which the operation of the hopper collector is separately controllable. Where more than one tank unit is employed, the shaft 36 may be extended, as indicated in Fig. 1, the entire length of the bank of units, which provides for operation of the collectors of the entire apparatus from a single prime mover.

I claim:

1. In apparatus for separating suspended solids from liquids, the combination with a tank having a plurality of compartments, the dividing wall between adjacent compartments being tapered at the top and the top of the wall lying below the normal level of the liquid in the tank, a hopper associated with each compartment, and mechanical means operating in each compartment for removing the settled sediment to the associated hopper.

2. In apparatus for separating suspended solids from liquids, the combination with a tank having a plurality of compartments separated by division walls tapered at the top, the tops of said division walls lying below the normal level of the liquid in the tank, and mechanical means in each compartment for clearing the compartments of settled sediment.

3. In apparatus for separating suspended solids from liquids, the combination with a tank having a plurality of longitudinal compartments separated in each instance by a division wall tapered at the top, and of such height as to be submerged when the liquid is at the normal level in the tank, a mechanical collector operating in each compartment to sweep the settled sediment therefrom, and means at one end of the tank for receiving the collected sediment.

4. In apparatus for separating suspended solids from liquids, the combination with a tank having its bottom divided into a plurality of transversely contiguous and relatively shallow channels over all of which the said liquid is free to circulate and in which is deposited all sediment settling from the liquid, of hopper means with which said channels communicate, and mechanical means operating in each of said channels for transferring the settled sediment therein to the said hopper means, each of said transferring means consisting of an independent conveyer including flights adapted to contact with and to sweep substantially the entire bottom surfaces of the channels in which they operate.

5. In apparatus for separating suspended solids from liquids, the combination with a tank, partitions dividing the bottom of the tank into a plurality of relatively shallow channels, of means for circulating a liquid through the tank over the said channels including an outlet located above the tops of said partitions, a hopper at one end of said channels, and mechanical means operating in each of the channels for transferring the sediment therein to the said hopper, said transferring means each consisting of an independent conveyer and flights carried thereby adapted to contact with and to sweep the entire bottom surfaces of the channels in which they operate.

6. In apparatus for separating suspended solids from liquids, the combination with a tank, partitions dividing the bottom of the tank into a plurality of relatively shallow channels, of a main hopper into which said channels empty, a sub-hopper associated with the main hopper, means for circulating a liquid through the tank over the channels including an outlet located above the tops of said partitions, a mechanical conveyer in each of said channels adapted to sweep the sludge collecting therein into the main hopper, mechanical conveying means in the main hopper adapted to transfer the sludge collected therein to the said sub-hopper, and means for removing the collected sludge from said sub-hopper.

7. In apparatus for separating suspended solids from liquids, the combination with a tank having its bottom divided into a plurality of transversely contiguous and relatively shallow channels, said channels encompassing the entire space between two opposite side walls of the tank and extending uninterruptedly from one of the remaining side walls, a hopper into which said channels empty, means for circulating a liquid through the tank above the said channels, and an independent mechanical conveyer operating in each of said channels and adapted by contact with the bottoms of the channels to sweep the sediment collecting in said channels into the said hopper.

MARCUS B. TARK.